United States Patent
Kage

(10) Patent No.: US 6,272,119 B1
(45) Date of Patent: Aug. 7, 2001

(54) METHOD OF CDMA RADIO WAVE COMMUNICATION WITH TRANSMISSION QUALITY DETECTION AND CONTROLLING AND A CDMA BASE AND MOBILE STATIONS WITH QUALITY DETECTION AND CONTROLLING

(75) Inventor: Kouzou Kage, Sagamihara (JP)

(73) Assignee: YRP Mobile Telecommunications Key Technology Research Laboratories Co., Ltd., Yokosuka (JP)

( * ) Notice: Subject to any disclaimer, the term of this patent is extended or adjusted under 35 U.S.C. 154(b) by 0 days.

(21) Appl. No.: 09/037,044

(22) Filed: Mar. 9, 1998

(30) Foreign Application Priority Data

Mar. 26, 1997 (JP) .................................................. 9-089997
Mar. 26, 1997 (JP) .................................................. 9-089998

(51) Int. Cl.$^7$ .................................................. H04J 13/00

(52) U.S. Cl. .......................................... 370/335; 370/342

(58) Field of Search .................................... 370/342, 335, 370/252, 465, 468, 521, 479; 375/130

(56) References Cited

U.S. PATENT DOCUMENTS

| | | |
|---|---|---|
| 4,841,527 | 6/1989 | Raychaudhuri et al. . |
| 5,396,516 | * 3/1995 | Padovani et al. .................. 375/225 |
| 5,923,700 | * 7/1999 | Zhang ................................ 375/200 |

* cited by examiner

Primary Examiner—Dang Ton
Assistant Examiner—Ken Vanderpuye
(74) Attorney, Agent, or Firm—Connolly Bove Lodge & Hutz

(57) ABSTRACT

In a first CDMA communication method, a CDMA radio wave signal is transmitted at a first place (a base station). A mobile unit receives the first CDMA radio wave signal and stores at least a portion of the data in the received signal and returns it to the base station by attaching the portion of the data to second data to be transmitted through spectrum spreading, wherein the data rate of the attached data is higher than the second data. The base station detects an upward line transmission quality from the received second CDMA radio wave signal from the mobile unit and detects a downward line transmission quality from the attached data forwarded by the mobile station. The base station outputs the downward line transmission quality when the upward line transmission quality is higher than a reference. When the downward line transmission quality is lower than a reference, the data is retransmitted from the base station and for a predetermined interval in this condition, transmission is stopped as transmission controlling. In a second CDMA communication method, the downward line transmission quality is measured in the mobile station and the data of downward line transmission quality is attached in place of the forwarded data and transmission controlling is similarly provided. Corresponding base and mobile stations are also disclosed.

16 Claims, 13 Drawing Sheets

FIG. 3A ERROR CORRECTION CODE SIG (X1)

| F1 F2 F3 ···· FP | I1 ············ IM |

FIG. 3B PN CODE SIG (X3)

| C11 C12 ····· C1N | ············ | CM1 CM2 ·· CMN |

FIG. 3C SS SIG (X2)

| F1 F2 F3 ···· FP | S11 S12 ····· S1N | ············ | SM1 SM2 ·· SMN |

FIG. 3D FIRST REC SIG (X7)

| F1 F2 F3 ···· FP | S11 S12 ····· S1N | ············ | SM1 SM2 ·· SMN |

τ1

FIG. 3E PN CODE SIG (X9)

| C11 C12 ····· C1N | ············ | CM1 CM2 ·· CMN |

FIG. 3F DE-SS SIG (X8)

| F1 F2 F3 ····· FP | I1 ············ IM |

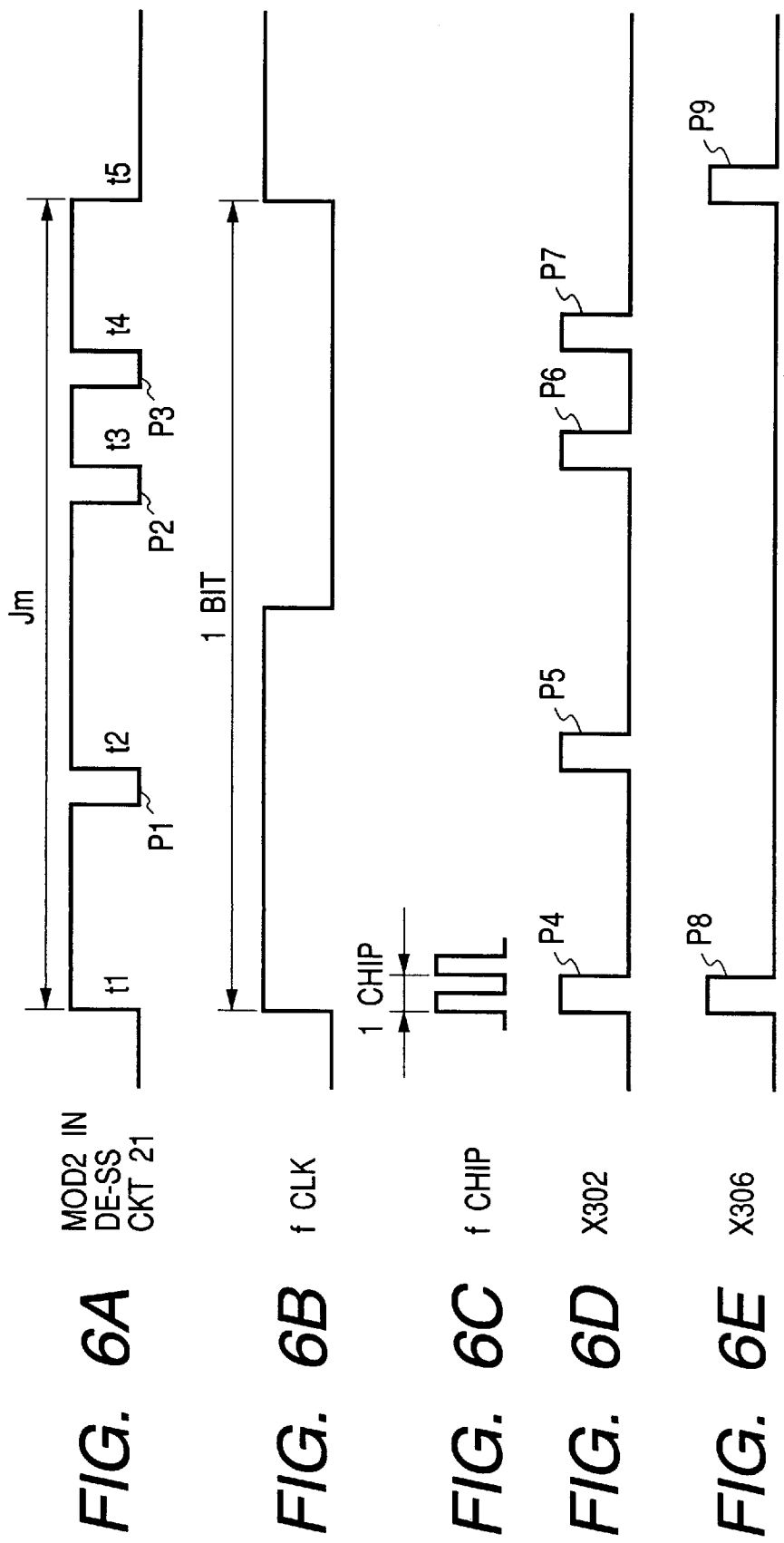

FIG. 11A CONBINED SIG (X114)
| F1 F2 F3 ····· Fp | J1 | ········ | JM | E1 ········· EM |

FIG. 11B PN CODE SIG (X16)
| D11 D12 ····· D1N | ········ | DM1 DM2 ·· DMN | DX1 DX2 ····· DXM |

FIG. 11C SS SIG (X115)
| F1 F2 F3 ····· Fp | T11 T12 ····· T1N | ········ | TM1 TM2 ·· TMN | TX1' TX2' ·· TXM' |

FIG. 11D SECOND REC SIG (X120)
| F1 F2 F3 ····· Fp | T11 T12 ····· T1N | ········ | TM1 TM2 ·· TMN | TX1' TX2' ·· TXM' |

⟷ τ2

FIG. 11E PN CODE (X22)
| D11 D12 ····· D1N | ········ | DM1 DM2 ·· DMN | DX1 DX2 ····· DXM |

FIG. 11F DE-SS SIG (X121)
| F1 F2 F3 ····· Fp | J1 | ········ | JM | E1 ········· EM |

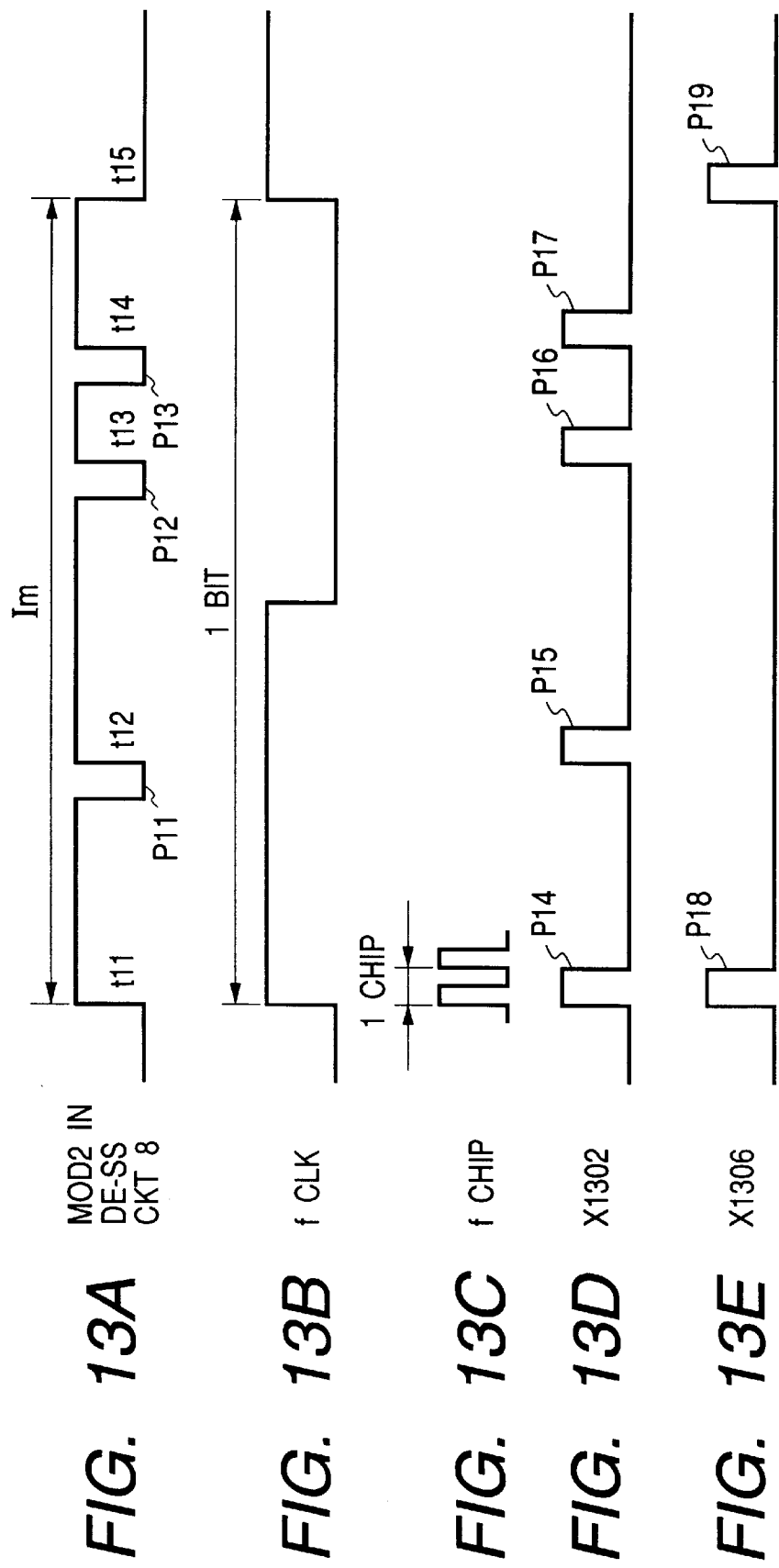

METHOD OF CDMA RADIO WAVE COMMUNICATION WITH TRANSMISSION QUALITY DETECTION AND CONTROLLING AND A CDMA BASE AND MOBILE STATIONS WITH QUALITY DETECTION AND CONTROLLING

BACKGROUND OF THE INVENTION

1. Field of the Invention

This invention relates to a method of CDMA radio wave communication and a base station and a mobile station using CDMA system.

2. Description of the Prior Art

A method of CDMA radio wave communication system for providing communication between a base station and a plurality of mobile stations is known. Such a prior art method is disclosed in U.S. Pat. No. 4,841,527. The method for transmitting information includes the steps of initially transmitting information in a code division multiple access channel, a determination for seeing if the information has been correctly received at the transmitter and by inference, by other receivers, and if not, re-transmitting the information with a selected time delay.

SUMMARY OF THE INVENTION

The aim of the present invention is to provide a superior method of CDMA radio wave communication, a superior base station, and a superior mobile station.

According to the present invention, a first method of CDMA radio wave communication is provided which comprises the steps of: generating a first radio wave signal including the steps of: spectrum-spreading first data with a first PN code; and transmitting the spectrum-spread first data from a first place as the first radio wave signal; receiving the first data from the first radio wave signal from the first place at a second place remote from the first place; de-spectrum-spreading the received first data; converting at least a portion of the de-spectrum-spread first data into data-rate converted data having a first data rate; attaching the data-rate-converted data to a second data having a second data rate to output a combined data, the first data rate being higher than the second data rate; spectrum-spreading the combined data with a second PN code; transmitting the spectrum-spread combined data from the second place; receiving the transmitted combined data at the first place; de-spectrum-spreading the received combined data; measuring a first transmission quality of the received combined data at the first place; measuring a second transmission quality of the data-rate-converted data at the first place; and outputting the measured second transmission quality when the first transmission quality is higher than a reference.

The first method may further comprise the step of: storing the first data at the first place, wherein the first transmission quality is measured by detecting a first error rate in the de-spectrum-spreading the third data and the second transmission quality is measured by detecting a second error rate through comparing the stored first data and de-spectrum-spread fourth data.

The first method may further comprise the steps of: averaging the first error rate to obtain the first transmission quality at the first place; and averaging the second error rate to obtain the second transmission quality at the first place.

The first method may further comprise the step of: controlling generating first radio wave signal in accordance with the measured second transmission quality. In this case, controlling generating first radio wave signal is made such that the second transmission quality is increased when the second transmission quality is lower than a second reference and the first transmission quality is higher than the reference at the first place and the transmission efficiency is increased when the second transmission quality is higher than the second reference.

The first method may further comprise the steps of: storing the first data at the first place; reading the first data; and re-transmitting the read first data after the first data is once transmitted by generating the first radio wave signal from the first place when the first transmission quality is higher than the reference and the second transmission quality is lower than a second reference.

The first method may further comprise the steps of: measuring an interval in the condition that the first transmission quality is higher than the reference and second transmission quality is lower than the second reference at the first place; judging whether the interval is longer than a reference value at the first place; and stopping generating the first radio wave signal from the first place when the interval is longer than the reference.

According to the present invention, a first base station is provided, which comprises: a radio wave generation circuit including: a spectrum-spreading circuit for spectrum-spreading a first data with a first PN code; and a transmitting circuit for transmitting the spectrum-spread first data; a receiving circuit for receiving a radio wave including combination data including a second data and data-rate-converted data spectrum-spread with a second PN code from a mobile station, the data-rate-converted data being generated from at least a portion of the first data received by a mobile station, the data-rate-converted data having first data rate higher than a second data rate of the second data; a de-spectrum-spreading circuit for de-spectrum-spreading the received combination data; a first measuring circuit for measuring a first transmission quality of the upward transmission from a mobile station from the combination data from the de-spectrum-spreading circuit; a second measuring circuit for measuring a second transmission quality of the downward transmission to the mobile unit from the data-rate-converted data from the de-spectrum-spreading circuit; and an outputting circuit for outputting the measured second transmission quality when the first transmission quality is higher than a reference.

According to the present invention, a first mobile station is provided, which comprises: a receiving circuit for receiving first data spectrum-spread with a first PN data and transmitted from a base station; a de-spectrum-spreading circuit for de-spectrum-spreading the first data from the receiving circuit with a first PN data; a data-rate-conversion circuit for data-rate-converting at least a portion of the first data from the de-spectrum-spreading circuit to have a second data rate to output data-rate-converted data; an attaching circuit for attaching the data-rate-converted data to second data to output a combination data, a data rate of the data-rate-converted data being higher than a data rate of the second data; a spectrum-spreading circuit for spectrum-spreading the combination data with a second PN code; and a transmitting circuit for transmitting the spectrum-spread combination data.

According to this invention, there is provided a second method of CDMA radio wave communication comprising the steps of: generating a first radio wave signal at a transmission efficiency including: spectrum-spreading first data with a first PN code; and transmitting the spectrum-spread first data from a first place as the first radio wave signal; receiving the first data from the first radio wave signal from the first place at a second place remote from the first place; de-spectrum-spreading the received first data; measuring a first transmission quality of the received first data at the second place to output transmission quality data; attaching the transmission quality data to second data to output a combined data such that the transmission quality data in the combined data is higher than a second data rate of the second data in the combined data; spectrum-spreading the combined data with a second PN code; transmitting the spectrum-spread combined data from the second place; receiving the transmitted combined data at the first place; de-spectrum-spreading the received combined data; measuring a second transmission quality of the de-spectrum-spread combined data in response to the de-spectrum-spreading; extracting the transmission quality data from de-spectrum-spread combined data at the first place; and outputting the fourth data representing the first transmission quality when the second transmission quality is higher than a reference.

In the second method, wherein the first transmission quality is measured by detecting a first error rate of the de-spectrum-spread first data and the second transmission quality is measured by detecting a second error rate of the de-spectrum-spread combined data. Moreover, this method, further comprises the steps of: averaging the first error rate to obtain the first transmission quality at the first place; and averaging the second error rate to obtain the second transmission quality at the first place.

The second method may further comprise the step of: controlling generating first radio wave signal to in accordance with the extracted transmission quality data. Moreover, in this method, controlling generating first radio wave signal is made such that the first transmission quality is increased when the first transmission quality is lower than a second reference and the second transmission quality is higher than the reference at the first place and the transmission efficiency is increased when the first transmission quality is higher than the second reference.

The second method may further comprise the steps of: storing the first data at the first place; reading the first data; and transmitting the read first data after the first data is once transmitted by generating the first radio wave signal from the first place when the first transmission quality is lower than the second reference and the second transmission quality is higher than the reference.

The second method may further comprise the steps of: measuring an interval in the condition that the first transmission quality is lower than a second reference and the second transmission quality is higher than the reference at the first place; Judging whether the interval is longer than a reference value; and stopping generating the first radio wave signal from the first place when the interval is longer than the reference value.

According to this invention a second base station is provided which comprises: a radio wave generation circuit for generating a first radio wave signal at a transmission efficiency including: a spectrum-spreading circuit for spectrum-spreading a first data with a first PN code; and a transmitting circuit for transmitting the first data from the spectrum-spreading circuit as the first radio wave signal; a receiving circuit for receiving a second radio wave including second data and transmission quality data representing a first transmission quality of downward line to a mobile station from the transmitted first data received by the mobile station, the transmission quality data having first data rate higher than a second data rate of the second data; a de-spectrum-spreading circuit for de-spectrum-spreading the second data and transmission quality data from the receiving circuit; a measuring circuit responsive to the de-spectrum-spreading circuit for measuring a second transmission quality of the second data; an extracting circuit for extracting the transmission quality data from an output of the de-spectrum-spreading circuit; and an outputting circuit for outputting the detected transmission quality data when the measured second transmission quality is higher than a reference.

According to this invention a second mobile station is provided which comprises: a receiving circuit for receiving first data spectrum-spread with a first PN data and transmitted from a base station; a de-spectrum-spreading circuit for de-spectrum-spreading the first data from the receiving circuit with a first PN data; a measuring circuit responsive to the de-spectrum-spreading circuit for measuring a transmission quality of the downward transmission line from the base station from an output of the de-spectrum-spreading circuit to generate transmission quality data; an attaching circuit for attaching the transmission quality data to second data to output a combined data such that the transmission quality data having first data rate higher than a second data rate of the second data; a spectrum-spreading circuit for spectrum-spreading the combined data with a second PN code; and a transmitting circuit for transmitting the spectrum-spread combined data.

The second mobile station may further comprise: an error rate correction code signal conversion circuit for converting the second data to an error-correction-code signal and supplying the error-correction-code signal to the attaching circuit as the second data.

BRIEF DESCRIPTION OF THE DRAWINGS

The object and features of the present invention will become more readily apparent from the following detailed description taken in conjunction with the accompanying drawings in which:

FIGS. 3A to 3F are illustrations of data formats of respective signals in the CDMA radio wave communication system of first and second embodiments;

FIGS. 6A to 6E are timing charts of respective signals of the counter circuit in the first error rate measuring circuit shown in FIG. 5;

FIGS. 11A to 11F are illustrations of the second embodiment showing data formats of respective outputs regarding the upward transmission;

FIGS. 13A to 13E are timing charts showing respective signals of the counter circuit according to the second embodiment.

The same or corresponding elements or parts are designated with like references throughout the drawings.

DETAILED DESCRIPTION OF THE INVENTION (FIRST EMBODIMENT)

Figure 1:
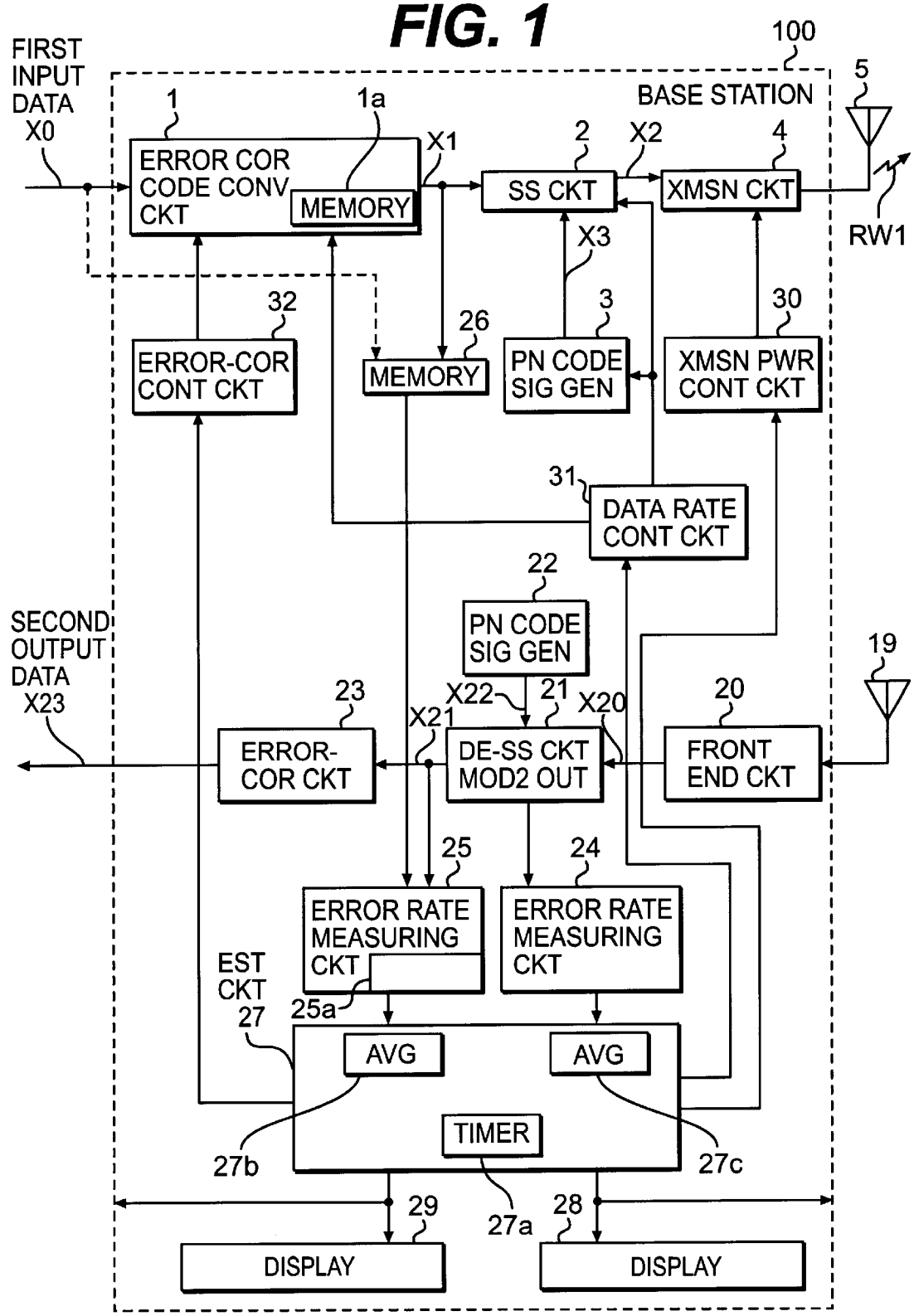
FIG. 1 is a block diagram of a first station of a first embodiment.
Figure 2:
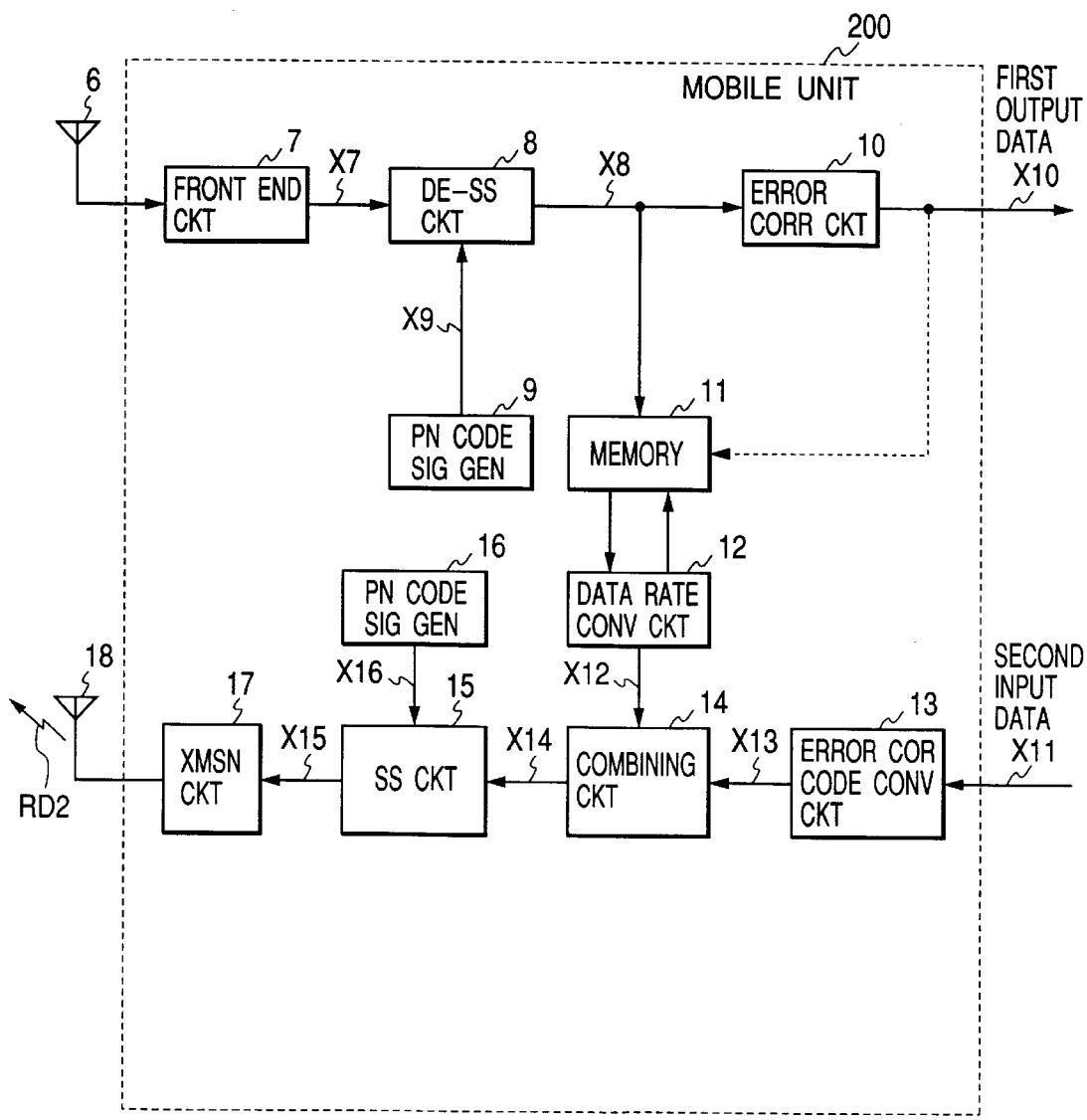
FIG. 2 is a block diagram of a second station of the first embodiment, wherein the first and second stations from a CDMA communication system.

FIG. 1 is a block diagram of a first station of the first embodiment and FIG. 2 is a second station of the first embodiment, wherein the first and second stations from a CDMA communication system. FIGS. 3A to 3F are illustrations of data formats of respective signals in the CDMA radio wave communication system of the first embodiment.

In a first station 100, for example, a base station 100 at a first place, a first input data X0 is supplied to an error correction code conversion circuit 1 including a memory 1a to convert the first data into an error correction code signal X1 under control of an error correction control circuit 32. The error correction code signal X1 is spectrum-spread by a spectrum spreading circuit 2 with a PN code signal X3 generated by a PN code generator 3 and outputs a spectrum-spread first data X2.

The spectrum-spread first data X2 is represented by the following equation.

$$Im+Cmn=Smn$$

wherein Im represents respective data bits forming the error correction code signal X1 and Cmn represents the code at a minimum duration pulse (one chip) forming the PN code signal X3, and Smn represents the code at one chip duration of the spectrum-spread first data X2. The operation+ represents an additional operation of mod2, that is, the Exclusive-OR operation.

The spectrum-spread first data X2 is supplied to a transmission circuit 4 where the spectrum-spread first data X2 is amplified under control of a transmission power control circuit 30 and transmitted by an antenna 5 as a first radio wave signal RW1.

More specifically, the transmission circuit 4 effects filtering the spectrum-spread first data and a narrow band modulation such as the PSK demodulation to limit the band of the spectrum-spread first data before amplifying. Moreover, a frequency conversion circuit (not shown) may be further provided to the transmission circuit 4 to convert the frequency band of the spectrum-spread first data to another frequency band.

In this embodiment, at the top of a signal train of the error correction signal X1, frame synchronizing signals $F_1, F_2, F_3, \ldots F_P$ are added as shown in FIG. 3A which are outputted by the spectrum-spreading circuit 2 as they are inputted, that is, they are not subjected to the additional operation of mod2.

At the second station 200, that is, a mobile station 200 at a second place remote from the base station 100, the first radio wave signal RW1 transmitted by the antenna 5 of the base station 100 is received by an front end circuit 7 through an antenna 6 of the mobile station 200. The front end circuit 7 outputs a first received signal X7 including the same data as the spectrum-spread signal X2 basically. In other words, the front end circuit 7 effects the inverse operations of the transmission circuit 4. That is, the front end circuit 7 effects the PSK demodulation if the transmission circuit 4 effects the PSK modulation, and frequency-down conversion if the transmission circuit 4 effects the frequency-up conversion. Moreover, the front end circuit 7 detects the frame synchronizing signals $F_1, F_2, F_3, \ldots F_P$ to detect frame synchronizing, and further detects chip synchronizing and bit synchronizing to obtain the following de-spectrum-spreading processing in an in-phase condition at the following data bits $I_1$ to $I_M$.

The first received signal X7 is supplied to a de-spectrum-spreading circuit 8 which is supplied with a PN code signal X9 which includes the same PN code Cmn as the N code signal X3 used in the base station 100 every chip unit. The de-spectrum-spreading circuit 8 outputs a de-spectrum-spread signal X8 as the following equation is provided every chip.

$$Smn+Cmn=(Im+Cmn)+Cmn=Im$$

The de-spectrum-spreading circuit 8 outputs frame synchronizing signals $F_1, F_2, F_3, \ldots F_P$ as they are inputted, that is the frame synchronizing signals $F_1, F_2, F_3, \ldots F_P$ are not subjected to de-spectrum-spreading operation.

The de-spectrum-spreading circuit 8 judges values Im of respective data bits by integrating the additional result of mod2 between Smn and Cmn. The de-spectrum-spread signal X8 is supplied to an error correction circuit 10 which effects the error-correction operation and outputs a first output data X10.

A memory 11 temporally stores the de-spectrum-spread signal X8, that is, the data bits $I_1$ to $I_M$ from the base station 100.

Then, an upward line transmitting operation will be described.

The second input data X11 is supplied to an error correction code conversion circuit 13 which converts the second input data X11 into an error correction code signal X13. The data bits $I_1$ to $I_M$ in the memory 11 is read by a data rate conversion circuit 12 to output a data-rate-converted signal X12, having a data rate higher than the error correction code signal X13, to be re-transmitted to the base station 100. A combining circuit 14 combines the error correction code signal X13 with the data-rate-converted data bits X12 from the memory 11 and the data rate conversion circuit 12 by attaching the data-rate-converted data bits X12 ($I_1, I_2, \ldots, I_M$) to the error correction code signal X13 (M bits of signal train $J_1, J_2, \ldots, J_M$) to output a combined signal X14 supplied to a spectrum spreading circuit 15, wherein the data-rate-converted data bits X12 is read and outputted every one chip unit as similar to the PN code signal X16. The spectrum spreading circuit 15 spectrum-spreads the combined signal X14 with a PN code signal X16 from a PN code signal generator 16 to output a spectrum-spread signal X15. Then, the following equations are provided every chip unit.

$$Jm+Dmn=Tmn$$

$$Im+Dxm=Txm$$

where Jm represents data bits forming the combined signal X14, Dmn represents a code of the PN code signal every chip unit, and Tmn represents the code of the spectrum-spread signal X15 every chip unit except the period of the frame synchronizing signals $F_1$ to $F_P$.

Figure 4A:
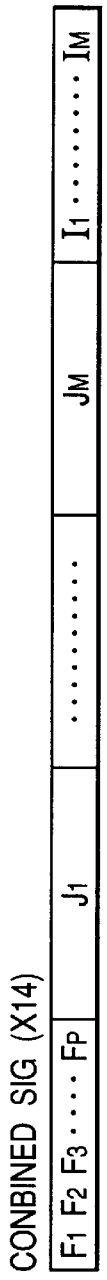
FIGS. 4A to 4F are illustrations of data formats of respective signals in the CDMA radio wave communication system of the first embodiment regarding the upward transmission.

At an end of the format of the combined signal X14 as shown in FIG. 4A, the data bits $I_1$ to $I_M$ are included in the combined signal X14. The data bits $I_1$ to $I_M$ represent data transmitted from the base station 100 and subjects to spectrum spreading by the PN codes $D_{X1}$, $D_{X2}$, ..., $D_{XM}$ in the PN code signal X16 and outputted as $T_{X1}$, $T_{X2}$, ..., $T_{XM}$ in the spectrum-spread signal X15. In this spectrum-spreading operation, the frame synchronizing signals $F_1$ to $F_P$ is not subject to the additional operation mod2 with the PN code signal X16.

The spectrum-spread signal X15 is transmitted as a second radio wave signal by a transmission circuit 17 through the operation similar to that of the transmission circuit 4 via an antenna 18.

The second radio wave signal is received by an antenna 19 of the base station 100. A front end circuit 20 receives the second radio wave signal from the antenna 19 and effects the operation similar to that of the front end circuit 7 to output a second received signal X20.

A de-spectrum spreading circuit 21 de-spectrum-spreads the second received signal X20 with a PN code X22 from a PN code signal generator 22 to output a de-spectrum-spread signal X21. Then, in an ideal condition, that is, there is no error, the following equations are provided.

Tmn+Dmn=(Jm+Dmn)+Dmn=Jm

Txm+Dxm=(Im+Dxm)+Dxm=Im wherein the PN code signal X22 is the same as the PN code X16 (Cmn, Dxm) and the frame synchronizing signals $F_1$ to $F_P$ are outputted as they are inputted.

The de-spectrum-spreading circuit 21 judges values Jm of respective data bits by integrating the additional result of mod2 between Tmn and Dmn and outputs an additional operation result of mod2. The de-spectrum-spread signal X21 is supplied to an error correction circuit 23 which effects the error-correction operation and output a second output data X23.

A quality of the second received signal X20 is measured by error rate measuring circuits 24 and 25.

The error rate measuring circuit 24 responsive to the additional operation of mod2 from the de-spectrum-spreading circuit 21 measures an error rate of the de-spectrum-spread signal X21. In other words, the error rate measuring circuit 24 measures a degree of stability of the de-spectrum-spread signal X21. The error rates reflects a transmission quality of the upward transmission line from the mobile station 200 to the base station 100.

For example, in the de-spectrum-spread signal X21, at an interval of $m^{th}$ bit, a value Jm is to be outputted. However, if there are errors, the value in the de-spectrum-spread signal X21 are not the value Jm the-number-of-error-times. The error rate is measured by counting the errors during M-bit interval, that is m=1 to M. The circuit structure of the error rate measuring circuit 24 will be in detail later.

In the above-mentioned example, the second received signal X20 is digital signal. However, if the output of the front end 20 is an analog signal, the PN code signal generator 22 generates another PN code signal showing values 1 and −1 instead of 1 an 0 (X22) and the additional operation mod2 is effected by a correlator including a multiplier or a matched filter.

In this case, a correlation output value is detected every one bit duration between the second received signal X20 and the PN code signal X22. The correlation output value is compared with a predetermined threshold value to output either 1 or 0 every one bit duration. During this, the quality of the second received signal X20 is measured by obtaining a difference between the correlation output value and the stored ideal value. This quality reflects the transmission quality of the upward transmission line from the mobile station 200 to the base station 100.

The error rate measuring circuit 25 measures an error rate of the signal train $I^1, I^2, \ldots I^M$ in the de-spectrum-spread signal X21. At first, the memory 26 stores the signal train $I^1, I^2, \ldots I^M$ in the error correction code signal X1 before transmission, compares the received signal train $I^1, I^2, \ldots I^M$ in the de-spectrum-spread signal X21 with the signal train $I^1, I^2, \ldots I^M$ read from the memory 26, and counts disagreement to measure the error rate of the signal train $I^1, I^2, \ldots I^M$.

The estimation circuit 27 includes a timer 27a and averaging circuits 27b and 27c. The estimation circuit 27 averages the first error rates from the first error rate measuring circuit 24 and the second error rates from the second error rate measuring circuit 25 to obtain first and second mean values of the first and second error rates from a predetermined times of measurements with the averaging circuits 27b and 27c respectively and displays the first and second means values on the first and second displays 28 and 29 respectively. Moreover, the estimation circuit 27 adaptively changes the transmission quality of downward transmission line and a transmission efficiency of the base station in accordance with the first mean value.

In this case, the estimation circuit 27 displays the first mean value as it is on the first display 28 but displays the second mean value on the second display 29 when the first mean value is less than a reference REF1, that is, the transmission quality of the up-ward line is higher than a first reference value.

As the result, the value displayed on the second display 29 corresponds the measurement value which would be measured in the mobile station 200 as a transmission quality of the downward line with respect to the signal train $I^1, I^2, \ldots I^M$ in the de-spectrum-spread signal X8. That is, because the second mean value is displayed only when the transmission quality of the upward line is higher than the first reference value, the error which would be developed in the upward line can be neglected.

In the CDMA radio wave communication system, the same frequency bands are generally used for both upward and downward lines. Therefore, the transmission qualities of the upward and downward lines are essentially equal. However, there may be a difference between the timing when the base station 100 transmits the first radio wave signal including the signal train $I^1, I^2, \ldots I^M$ and the timing when the mobile station 200 transmits the second radio wave signal including the signal train $I^1, I^2, \ldots I^M$. Moreover, when the mobile station 200 moves at a high speed because it is mounted on a vehicle, a variation cycle of phasing becomes extremely short. Therefore, because of the difference in the timings the transmission quality of the upward and downward lines may be different. Therefore, the affection of the transmission quality of the upward line to the transmission quality of the downward line is essentially removed and then, the transmission quality of the downward line is obtained.

Moreover, there is the case that the transmission qualities of the upward and downward lines are different because the scales of the transmission circuits 4 and 17 and the antennas 5, 6, 18, and 19 are different.

Operations of the base station 100 and the mobile station 200 will be described more specifically.

FIG. 3A shows the error code signal X1 including the frame synchronizing signals $F_1, F_2, F_3, \ldots, F_P$ at the top of the signal train of the error correction code signal X1, and, following to this, M data bits $I_1$ to $I_M$, each being assigned to one bit duration. This signal train of the error correction code signal X1 is intermittently transmitted several times.

Either the signal train of the error correction code X1 or a PN code is used to form the frame synchronization signal $F_1, F_2, F_3, \ldots F_P$. Each of codes of the frame synchronizing signals $F_1, F_2, F_3, \ldots, F_P$. occupies one chip duration and a total duration is a predetermined integer times of one bit duration. Moreover, several cycles of the PN code signal X3 itself may be used as the synchronizing signals $F_1, F_2, F_3, \ldots, F_P$.

In the mobile station 200, the front end circuit 7 includes a synchronizing circuit for detecting the synchronizing signals $F_1, F_2, F_3, \ldots, F_P$ to detect the frame and effects the bit synchronizing and the chip synchronizing to provide phase synchronizing for the de-spectrum-spreading in the de-spectrum-spreading circuit 8.

The PN code signal X3 includes PN codes, wherein one bit duration is divided to N chip durations. In FIG. 3B, PN codes are different every bit duration. However, it is also possible that a set of PN codes are repeatedly used at every bit duration.

The spectrum-spreading circuit 2 effects the additional operation of mod2 between each data bit Im in the error correction code signal X1 and each code Cmn of each chip duration in the PN code signal X3 to output the spectrum-spread code trains $S_{11}$ to $S_{1N}, \ldots, S_{M1}$ to $S_{MN}$ in the spectrum-spread signal X2 as shown in FIG. 3C. At the top thereof, the frame synchronizing signals $F_1, F_2, F_3, \ldots, F_P$ are attached as they are inputted.

In the mobile station 200, the received signal X7 includes the signal train $F_1, F_2, F_3, \ldots, F_P, S_{11}$, to $S_{1N}, \ldots, S_{M1}$ to $S_{MN}$ with a delay $\pi 1$ from transmission of the de-spectrum-spread signal X2 as shown in FIG. 3D. The PN code signal X9 shown in FIG. 3E includes the same PN codes $C_{11}$ to $C_{1N} \ldots, C_{M1}$ to $C_{MN}$ as the PN codes in the PN code signal X3. The de-spectrum-spreading circuit 8 effects the additional operation of mod2 between the each of data bits $S_{11}$ to $S_{1N}, \ldots, S_{M1}$ to $S_{MN}$ and the PN code signal X9 for de-spectrum-spreading, so that the data bits $I_1$ to $I_M$ are restored as shown in FIG. 3F. The frame synchronizing signals $F_1, F_2, F_3, \ldots, F_P$ are not de-spectrum-spread and outputted as they are.

In FIG. 4A, the combining circuit 14 outputs the combined signal X14 including the frame synchronizing signals $F_1, F_2, F_3, \ldots, F_P$ and following to this, M data bits of $J_1, J_2, \ldots, J_M$, and following to this, the data bits $I_1, I_2, \ldots, I_M$ received from the base station 100, wherein each bit of the data bits $I_1, I_2, \ldots, I_M$ is outputted at every chip duration.

Figure 4B:
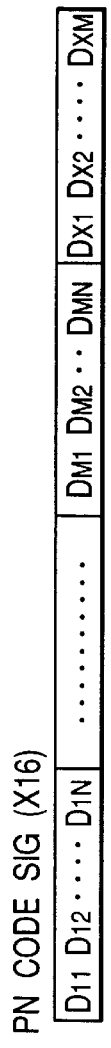
Figure 4C:
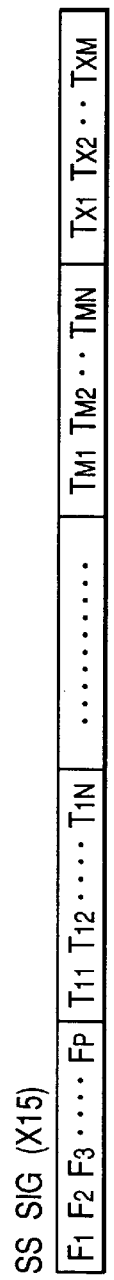

In FIG. 4B, the PN code signal X16 includes PN codes, wherein one bit duration is divided to N chip durations and the PN codes are different from the PN codes in the PN codes signal X3. In FIG. 4B, PN codes are different every bit duration. However, it is also possible that a set of PN codes are repeatedly used at every bit duration.

The spectrum-spreading circuit 15 spectrum-spreads the error correction code signal X13 in the combined signal X14 to output $T_{11}$ to $T_{1N}, \ldots, T_{M1}$ to $T_{MN}$ and effects the additional operation of mod2 between the data bits from the data rate conversion circuit 12 and the PN code signal X16 to output $T_{X1}$ to $T_{XM}$.

In the above-mentioned description, all of data bits $I_1, I_2, \ldots, I_M$ received from the base station 100 are re-transmitted. When all of data bits $I_1, I_2, \ldots, I_M$ are returned to the base station 100, a measurement accuracy is high. However, it is also possible to return a portion of the data bits $I_1, I_2, \ldots, I_M$. That is, the memory 11, the data rate conversion circuit 12, and the combining circuit 14 returns at least a portion of the data bits $I_1, I_2, \ldots, I_M$.

If a portion of data bits $I_1, I_2, \ldots, I_M$ are returned, it is possible to make the total length of the data train to be transmitted from the mobile unit 200, that is, a total interval for transmitting the data train, short. Moreover, if a portion of the data bits are returned and each bit is transmitted over a plurality of chip periods, the error rate in the upward line can be made lower.

FIGS. 4A to 4F are illustrations of data formats of respective signals in the CDMA radio wave communication system of the first embodiment regarding the upward transmission.

Figure 4D:
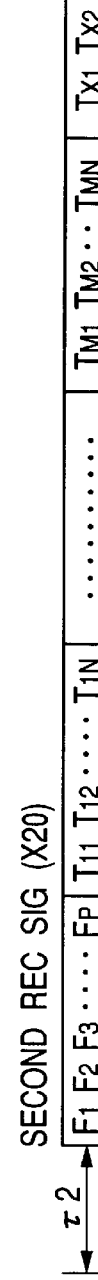
Figure 4E:
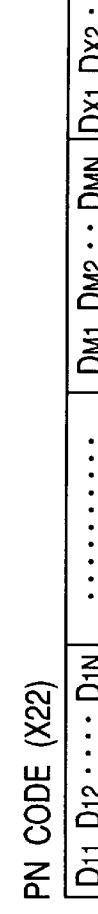

In the base station 100, the second received signal X20 includes the signal train $F_1, F_2, F_3, \ldots, F_P, T_{11}$ to $T_{1N}, \ldots, T_{M1}$ to $T_{MN}$ with a delay $\pi 2$ from the spectrum-spread signal X15 as shown in FIG. 4D. The PN code signal X22 includes the same PN codes $D_{11}$ to $D_{1N} \ldots, D_{M1}$ to $D_{MN}$ as the PN codes in the PN code signal X16 as shown in FIG. 4B.

Figure 4F:
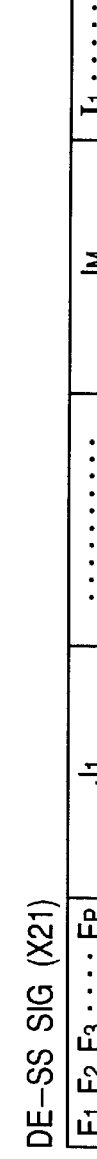

The de-spectrum-spreading circuit 21 effects the additional operation of mod2 between each of data bits $T_{11}$ to $T_{1N}, \ldots, T_{M1}$ to $T_{MN}$ and the PN code signal X22 (FIG. 4E) for de-spectrum-spreading, so that the data bits $J_1$ to $J_M$ and data bits $I_1, I_2, \ldots, I_M$ are restored as shown in FIG. 4F.

The first error rate measuring circuit 24 obtains the first error rate through analyzing the result of the de-spectrum-spreading operation between $T_{11}$ to $T_{1N}, \ldots, T_{M1}$ to $T_{MN}$ and the PN code X22 every one bit duration.

On the other hand, the second error rate measuring circuit 25 obtains the second error rate from the output of the memory including the data bits $I_1, I_2, \ldots, I_M$ and the data bits $I_1, I_2, \ldots, I_M$ included in the de-spectrum-spread signal X21 at the end of the de-spectrum-spread signal. This second error rate reflects the transmission qualities of the downward and upward lines.

The estimation circuit 27 averages the first error rate measured by the first error rate measuring circuit 24 over one transmission period or a plurality of transmission period. The second error rate measured by the second error rate measuring circuit 25 is estimated when the first error rate is lower than the reference REF1 and the mean value is obtained as similar.

Figure 5:
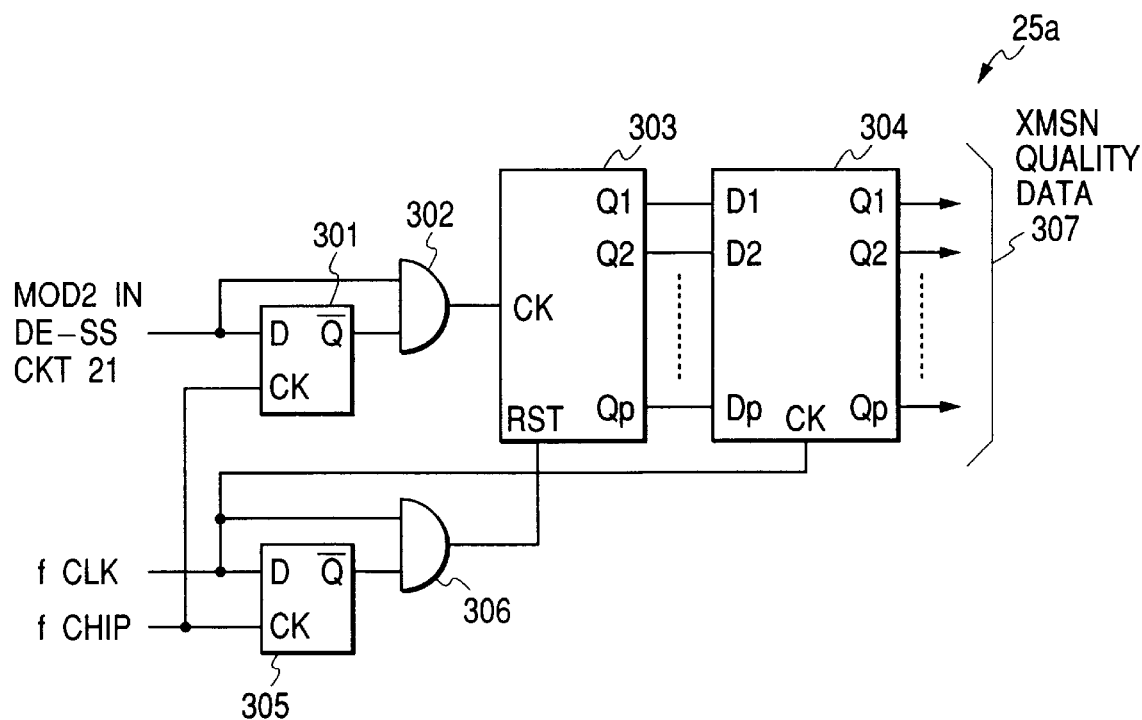
FIG. 5 is a schematic circuit diagram of a counter circuit of the first embodiment provided in the first error rate measuring circuit shown in FIG. 1.

FIG. 5 is a schematic circuit diagram of a counter circuit 25a of the first embodiment provided in the second error rate measuring circuit 25 shown in FIG. 1. FIGS. 6A to 6E are timing charts of respective signals of the counter circuit 25a in the first error rate measuring circuit shown in FIG. 5.

The de-spectrum-spreading signal X21 is supplied to a D flip-flop circuit 301 and to one input of a AND gate 302 and the other input of the AND gate 302 is supplied with $\overline{Q}$ output of the D flip-flop circuit 301. A clock input CK of the D flip-flop circuit 301 is supplied with a chip signal fCHIP having one chip duration. On the other hand, a D flip flop circuit 305 is supplied with a clock signal fCLK representing one bit duration at a D input and supplied with the chip signal fCHIP at a clock input CK thereof. The D flip flop circuits 301 and 305 act as one-chip delay circuits. An output of the AND gate 302 is supplied to a clock input CK of a counter 303 and an output of the AND gate 306 is supplied to a reset input RST of the counter 303. Parallel output terminals Q1 to Qp of the counter 303 are supplied to data inputs D1 to Dp of a register 304 of which clock input CK is supplied with the clock signal fCLK. The parallel outputs of the register 304 represent an error count value per one bit duration, that is, transmission quality data. The first error rate measuring circuit 25 stores the error count values every one bit duration and obtains the mean value.

An operation of the counter circuit 25a will be described.

FIGS. 6A to 6E are timing charts of the first embodiment showing conditions of respective signals of the counter circuit 25a at a data bit Jm regarding the de-spectrum-spread signal X21. In FIG. 6A, it is assumed that noise pulses p1 to p3 are appear in the de-spectrum-spread signal X21 at timings t2 to t4 due to interference or noise.

As shown in FIG. 6D, the AND gate 302 generates a pulse p4 in response to a rising edge of the de-spectrum-spread signal X21 and then, in response to the noise pulse p1 to p3, the AND gate 302 generates pulses p5 to p7. On the other hand, the AND gate 306 generates pulses p8 and p9 at t1 and t5 in response to rising edges of the clock signal fCLK similarly. The counter 303 counts in response to the output X302 of the AND gate 302. However, the pulses p8 and p9 resets the counter 303, so that the counter 303 counts only pluses p1 to p3 to output the error count, that is, the transmission quality data. With increase in the error count, the transmission quality decreases.

The estimation circuit 27 controls the error correction control circuit 32, the data rate control circuit 31, and the transmission power control circuit 30 in accordance with the mean value of the second error rate detected by the second error rate measuring circuit 25 when the first error rate detected by the error rate measuring circuit 24 is lower than the reference REF1. That is, the base station 100 adaptively controls a transmission power, data rate, and an ability of error correction in the error coded data X1.

At first, controlling the transmission power will be described.

It is desired that the transmission power is sufficient to transmit the first radio wave signal to the mobile station 200 in the service area of the base station 100 but minimum to prevent interference to other stations and prevent to consume too much electric power. The transmission power control circuit 30 controls the transmission power of the first radio wave signal in accordance with a control signal from the estimation circuit 27. That is, the power control circuit 30 decreases the transmission power within the range that the second error rate is not deteriorated with the transmission efficiency maintained.

Then, controlling the data rate will be described. If the chip rate is constant, with increase in the number N of chips of the PN codes to one bit, the error rate decreases but the data rate decreases. In other words, the lower the data rate, the higher the transmission quality. Then, the estimation circuit 27 controls the data rate by controlling the error correction control circuit 32 and data rate control circuit 31.

More specifically, if the chip rate is constant, the data rate control circuit 31 changes the number of chips N in the one bit duration in accordance with the mean value of the second error rate. That is, when the mean value of the second error rate is high, the number N of chips is increased to increase the transmission quality and when the mean value of the second error rate is low, the number N of chips is decreased to increase the transmission efficiency by controlling the PN code signal generator 3, the spectrum spreading circuit 2, and the error correction code conversion circuit 1.

The number of chips in the de-spectrum-spreading operation in the mobile station 200 should be also changed in accordance with the number N of chips in the spectrum spreading operation in the base station 100, so that data of the number N of chips is transmitted to the mobile station 200 before changing the number of chips in the base station 100.

Similarly, an interval necessary for transmitting a data increases with increase in the ability of error correction in the error correction code signal X1, so that the transmission efficiency per data decreases.

Then, the error correction control circuit 32 controls the ability of error correction in the error correction code signal X1 to provide a sufficient but minimum transmission quality in accordance with the mean value of second error rate.

Figure 7A:
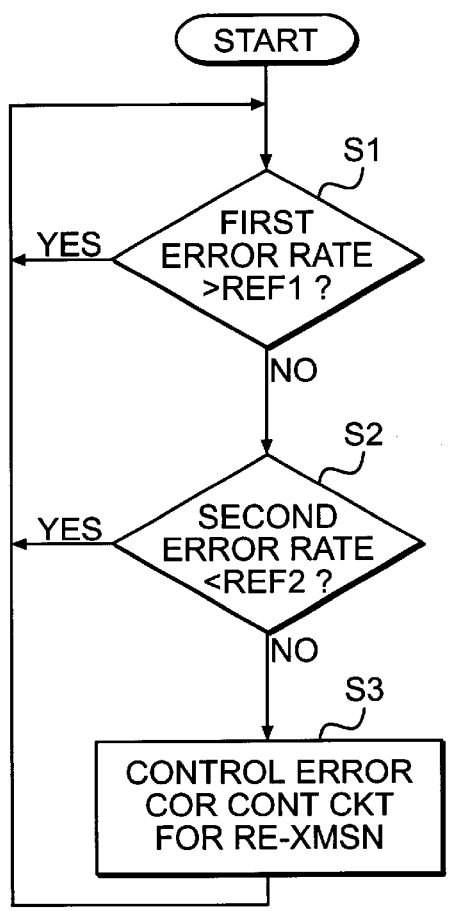
FIG. 7A shows a flow chart of first and second embodiments showing the operation of the estimation circuit.

FIG. 7A shows a flow chart showing the operation of the estimation circuit 27. The estimation circuit 27 judges whether the first error rate is higher than the reference REF1 in step sl. If the first error rate is higher than the reference REF1, it repeats the step sl. If the first error rate is not higher than the reference REF1, the estimation circuit 27 judges whether the second error rate is lower than the reference REF2 in step s2. If the second error rate is lower than the reference REF2, processing returns to step s1. If the second error rate is not lower than the reference REF2, the estimation circuit 27 controls the error correction control circuit 32 to control the error correction code conversion circuit 1 to re-output the data in the memory 1 to re-transmit the data to the mobile station 200.

Figure 7B:
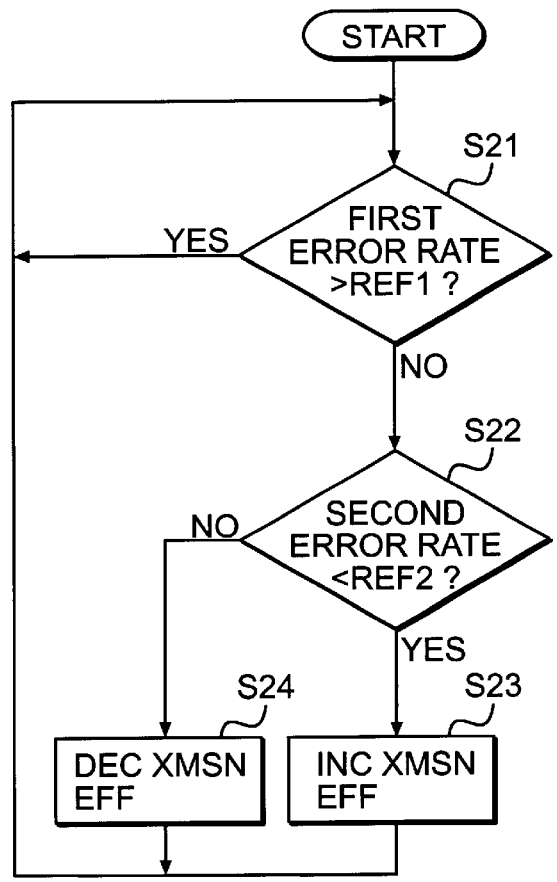
FIG. 7B shows a flow chart of first and second embodiments showing another operation of the estimation circuit.

FIG. 7B shows a flow chart showing another operation of the estimation circuit 27. The estimation circuit 27 judges whether the first error rate is higher than the reference REF1 in step s21. If-the first error rate is higher than the reference FEF1, repeats the step s21. If the first error rate is not higher than the reference REF1, the estimation circuit 27 judges whether the second error rate is lower than the reference REF2 in step s22. If the second error rate is not lower than the reference REF2, the estimation circuit 27 decreases the transmission efficiency by controlling the error correction control circuit 32 and/or the data rate control circuit 31 in step s24 and processing returns to step-s21. If the second error rate is lower than the reference REF2, the estimation circuit 27 increases the transmission efficiency by controlling the error correction control circuit 32 and/or the data rate control circuit 31.

Figure 8:
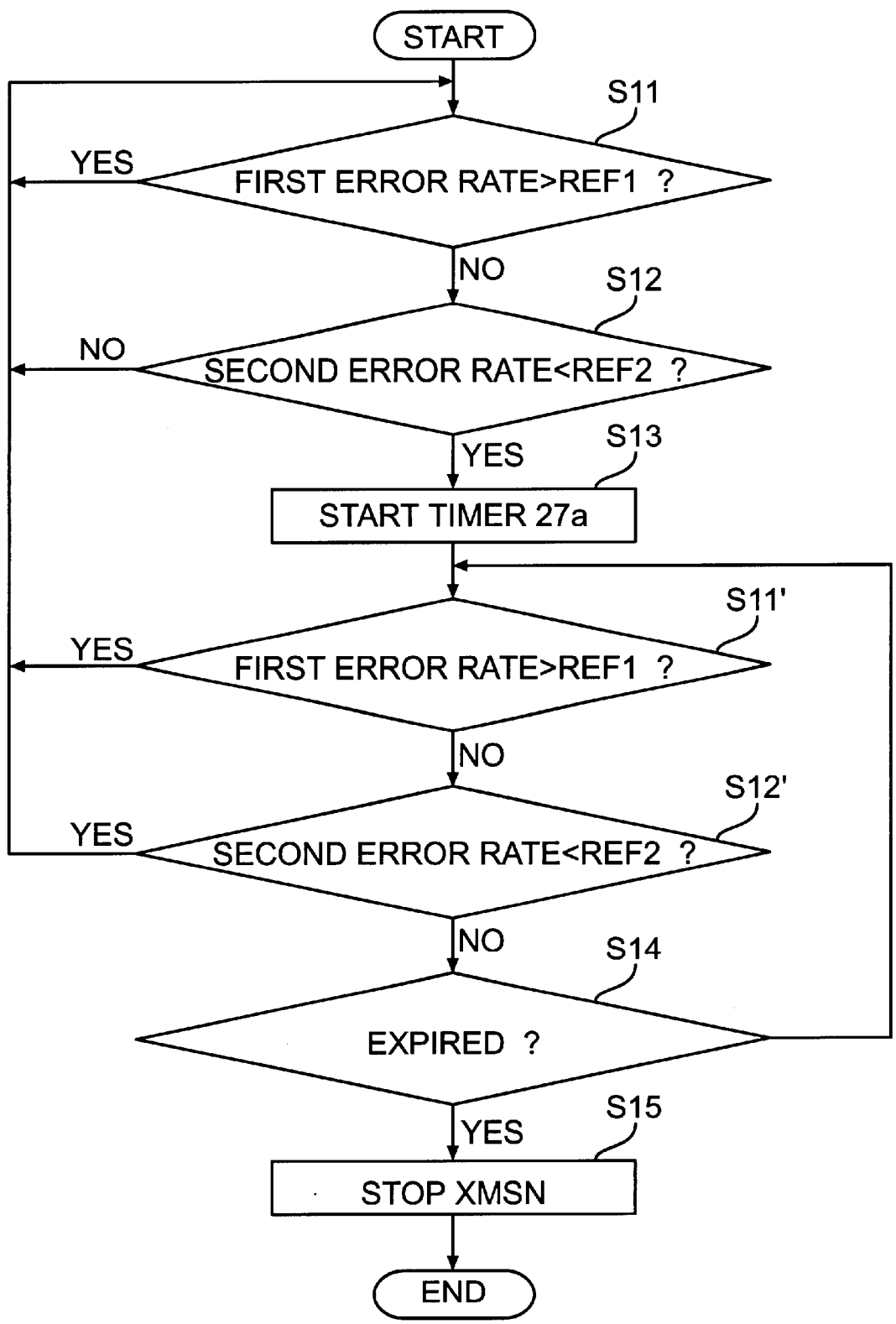
FIG. 8 shows a flow chart of the first and second embodiments showing another operation of the estimation circuit.

FIG. 8 shows a flow chart of the first embodiment showing still another operation of the estimation circuit 27. The estimation circuit 27 judges whether the first error rate is higher than the reference REF1 in step s11. If the first error rate is higher than the reference FEF1, it repeats the step s11. If the first error rate is not higher than the reference REF1, the estimation circuit 27 judges whether the second error rate is lower than the reference REF2 in step s12. If the second error rate is not lower than the reference REF2, processing returns to step s11. If the second error rate is lower than the reference REF2, the estimation circuit 27 starts the timer 27a included therein.

Then, the estimation circuit 27 judges whether the first error rate is higher than the reference REF1 again in step s11'. If the first error rate is higher than the reference FEF1, processing returns to step s11. If the first error rate is not higher than the reference REF1, the estimation circuit 27 judges whether the second error rate is lower than the reference REF2 in step s12' again. If the second error rate is lower than the reference REF2, processing returns to step s11. If the second error rate is not lower than the reference REF2, the estimation circuit 27 judges whether a predetermined interval set in the timer 27a has expired in step s14. If the predetermined interval has not expired, processing returns to step s11'. If the predetermined interval has expired in step s14, the estimation circuit 27 controls the transmission power control circuit 30 to stop transmitting the first radio wave signal in step s15.

In the above-mentioned embodiment, in the base station 100, the signal train $I_M$ is stored in the memory 26 from the error correction code signal X1. However, it is also possible that the signal train $I_M$ is stored in the memory 26 from the first input data X0. Similarly, in the mobile station 200, the signal train $I_M$ is stored in the memory 11 from the de-spectrum-spread signal X8. However, it is also possible that the signal train $I_M$ is stored in the memory 11 from the first output data X10.

When the estimation circuit 27 detects that the transmission quality of the downward line is lower than the reference for a predetermined interval, the estimation circuit 27 effects a diagnostic operation and can stops transmitting the first radio wave signal to prevent erroneous transmission of the first radio wave signal to reduce interference, loss in the frequency resources or the like.

(SECOND EMBODIMENT)

A method of CDMA communication, a base station, and a mobile station of a second embodiment will be described.

Figure 9:
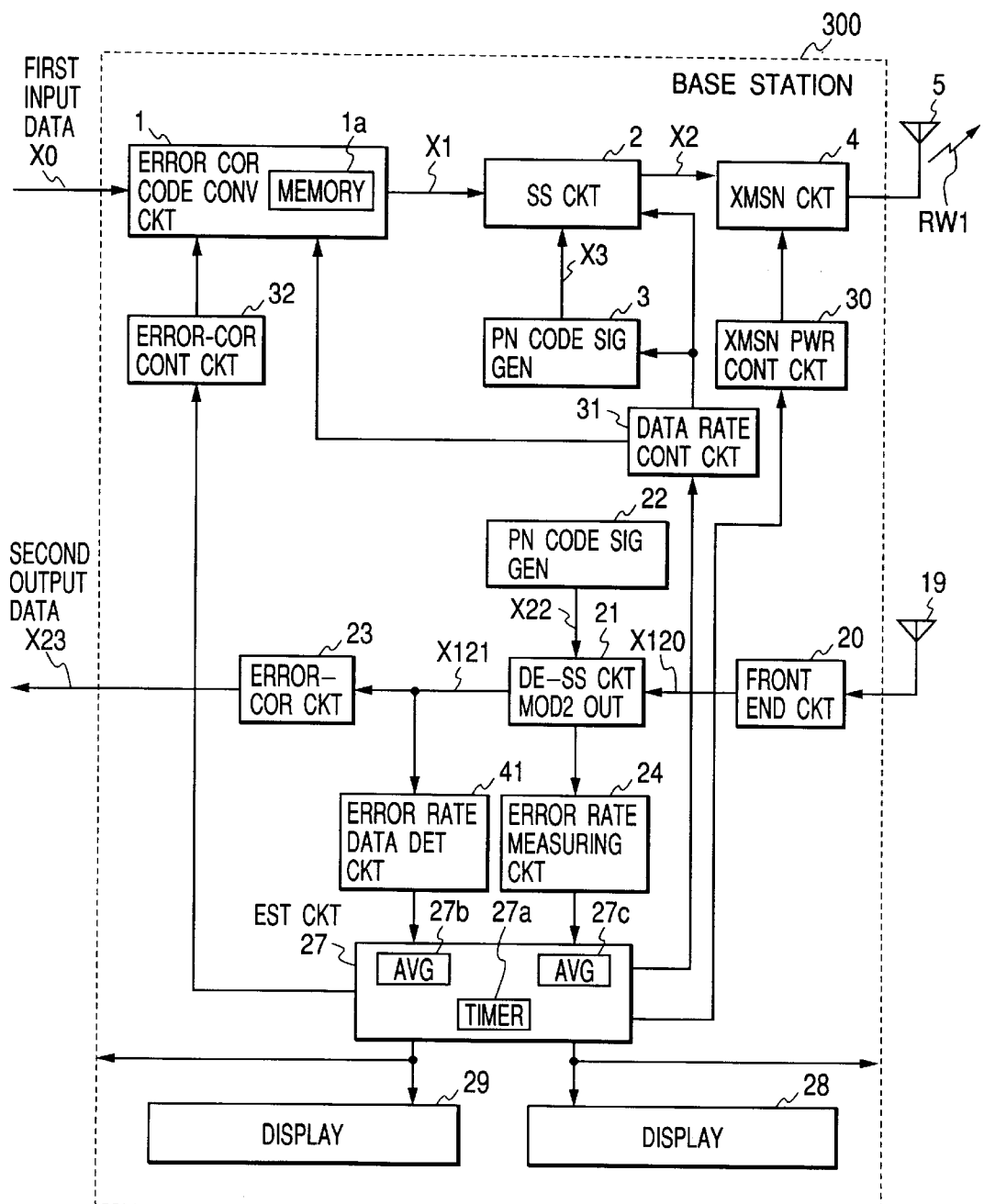
FIG. 9 is a block diagram of a third station of a second embodiment.
Figure 10:
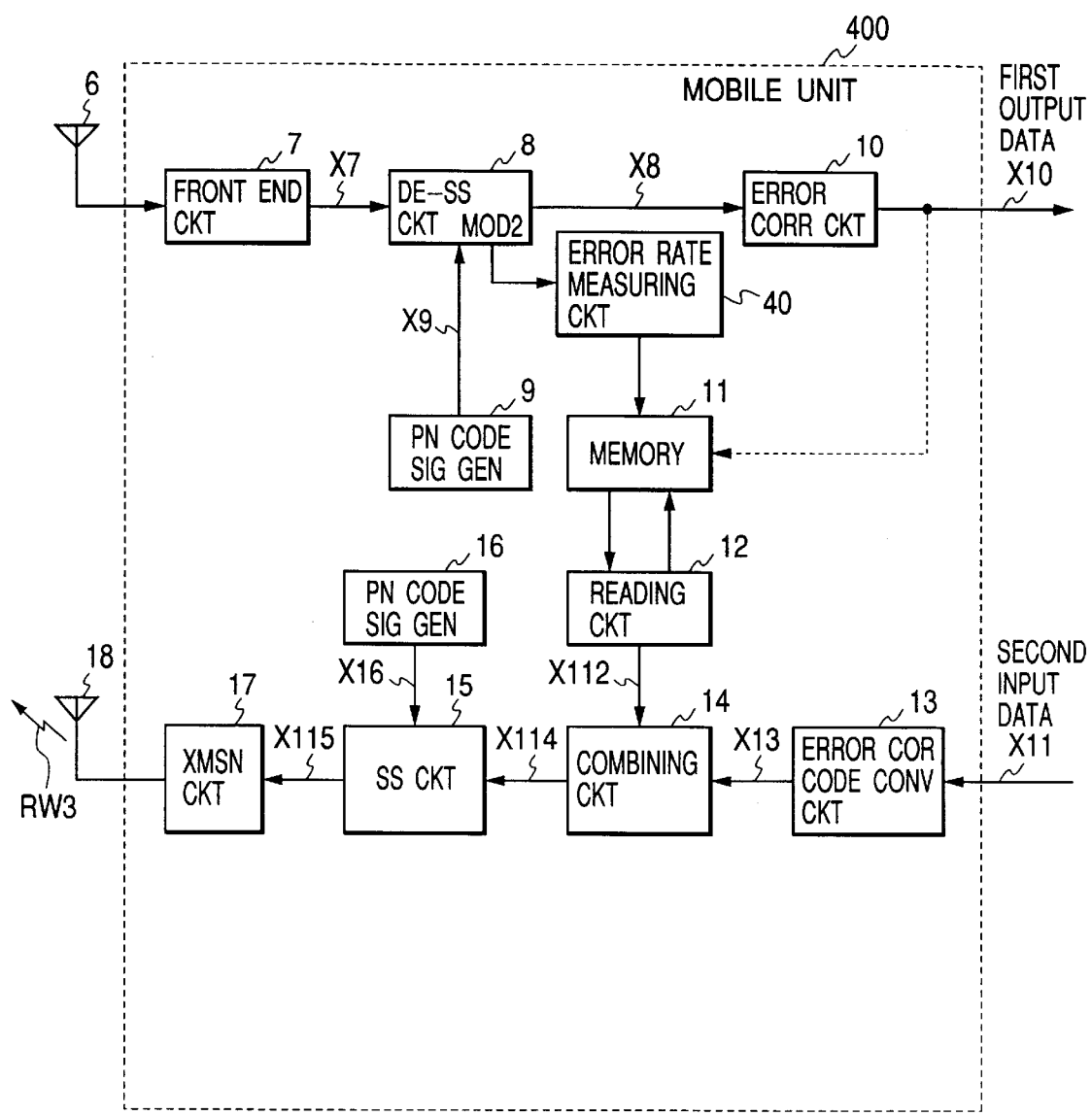
FIG. 10 is a fourth station of the second embodiment, wherein the third and fourth stations from a CDMA communication system.

FIG. 9 is a block diagram of a third station of the second embodiment and FIG. 10 is a fourth station of the second embodiment, wherein the third and fourth stations from a CDMA communication system. FIGS. 11A to 11F are illustrations of the second embodiment showing data formats of respective outputs regarding the upward transmission. FIGS. 3A to 3F are also referred in this embodiment.

In a third station 300, for example, a base station 300 at a third place, a first input data X0 is supplied to an error correction code conversion circuit 1 including a memory 1a to convert the first data into an error correction code signal X1 under control of an error correction control circuit 32. The error correction code signal X1 is spectrum-spread by a spectrum spreading circuit 2 with a PN code signal X3 generated by a PN code generator 3 and outputs a spectrum-spread first data X2.

The spectrum-spread first data X2 is represented by the following equation.

$$Im+Cmn=Smn$$

wherein Im represents respective data bits forming the error correction code signal X1 and Cmn represents the code at a minimum pulse (one chip) forming the PN code signal X3, and Smn represents the code at one chip of the spectrum-spread first data X2. The operation+represents an additional operation of mod2, that is, the Exclusive-OR operation.

The spectrum-spread first data X2 is supplied to a transmission circuit 4 where the spectrum-spread first data X2 is amplified under control of a transmission power control circuit 30 and transmitted by an antenna 5 as a first radio wave signal.

More specifically, the transmission circuit 4 effects filtering the spectrum-spread first data and a narrow band modulation such as the PSK demodulation to limit the band of the spectrum-spread first data before amplifying. Moreover, a frequency conversion circuit (not shown) may be further provided to the transmission circuit 4 to convert the frequency band of the spectrum-spread first data to another frequency band.

In this embodiment, at the top of a signal train of the error correction signal X1, frame synchronizing signals $F_1$, $F_2$, $F_3$, . . . $F_P$ are added as shown in FIG. 3A which are outputted by the spectrum-spreading circuit 2 as they are inputted, that is, they are not subjected to the additional operation of mod2.

At the fourth station 400, that is, a mobile station 400 at a fourth place, the first radio wave signal transmitted by the antenna 5 of the base station 300 is received by a front end circuit 7 through an antenna 6 of the mobile station 400. The front end circuit 7 outputs a first received signal X7 including the same data as the spectrum-spread signal X2 basically. In other words, the front end circuit 7 effects the inverse operations of the transmission circuit 4. That is, the front end circuit 7 effects the PSK demodulation if the transmission circuit 4 effects the PSK modulation, and frequency-down conversion if the transmission circuit 4 effects the frequency-up conversion. Moreover, the front end circuit 7 detects the frame synchronizing signals $F_1$, $F_2$, $F_3$, . . . $F_P$ to detect frame synchronizing, and further detects chip synchronizing and bit synchronizing to obtain the following de-spectrum-spreading processing in an in-phase condition at the following data bits $I_1$ to $I_M$.

The first received signal X7 is supplied to a de-spectrum-spreading circuit 8 which is supplied with a PN code signal X9 which includes the same PN code Cmn as the PN code signal X3 used in the base station 100 every chip unit. The de-spectrum-spreading circuit 8 outputs a de-spectrum-spread signal X8 wherein the following equation is provided every chip.

$$Smn+Cmn=(Im+Cmn)+Cmn=Im$$

The de-spectrum-spreading circuit 8 outputs frame synchronizing signals $F_1$, $F_2$, $F_3$, . . . $F_P$ as they are inputted, that is the frame synchronizing signals $F_1$, $F_2$, $F_3$, . . . $F_P$ are not subjected to de-spectrum-spreading operation.

The de-spectrum-spreading circuit 8 judges values Im of respective data bits by integrating the additional result of mod2 between Smn and Cmn. The de-spectrum-spread signal X8 is supplied to an error correction circuit 10 which effects the error-correction operation and output a first output data X10.

Moreover, the de-spectrum-spreading circuit 8 supplies an output of the additional operation of mod2 to an error rate measuring circuit 40. The error rate measuring circuit 40 measures a third error rate of the first received signal X7 from the output of the additional operation of mod2 from the de-spectrum-spreading circuit 8 and outputs error rate data indicative of the third error rate.

A memory 11 temporally stores the error rate data from the error rate measuring circuit 40.

Then, an upward line transmitting operation will be be described.

The second input data X11 is supplied to an error correction code conversion circuit 13 which converts the second input data X11 into an error correction code signal X13. The error rate data in the memory 11 is read by a reading circuit 112 to output error rate data X112, having a data rate higher than the error correction code signal X13. A combining circuit 14 combines the error correction code signal X13 with the error rate data X112 from the memory 11 by attaching bits of the error rate data $E_1$, $E_2$, . . . , $E_M$ to the error correction code signal X13 (M bits of signal train $J_1$, $J_2$, . . . , $J_M$) to output a combined signal X114 supplied to a spectrum spreading circuit 15, wherein the error rate data X112 is read and outputted every one chip unit as similar to the PN code signal X16. The spectrum spreading circuit 15 spectrum-spreads the combined signal X114 with a PN code signal X16 from a PN code signal generator 16 to output a spectrum-spread signal X115. Then, the following equations are provided every chip unit.

$$Jm+Dmn=Tmn$$

$$Em+Dxm=Txm$$

where Jm represents data bits forming the combined signal X114, Dmn represents a code of the PN code signal every chip unit, and Tmn represents the code of the spectrum-spread signal X115 every chip unit except the period of the frame synchronizing signals $F_1$ to $F_P$.

At an end of the format of the combined signal X114 as shown in FIG. 11A, the data bits $E_1$ to $E_M$ are included in the combined signal X114. The data bits $E_1$ to $E_M$ represent the third error rate and subjects to spectrum spreading by the PN codes $D_{X1}, D_{X2}, \ldots, D_{XM}$ in the PN code signal X16 and outputted as $T_{X1}, T_{X2}, \ldots, T_{XM}$ in the spectrum-spread signal X115. In this spectrum-spreading operation, the frame synchronizing signals $F_1$ to $F_P$ is not subject to the additional operation mod2 with the PN code signal X16.

The spectrum-spread signal X115 is transmitted as a third radio wave signal RW3 by a transmission circuit 17 through the operation similar to that of the transmission circuit 4 via an antenna 18.

The third radio wave signal RW3 is received by an antenna 19 of the base station 300. An front end circuit 20 receives the third radio wave signal from the antenna 19 and effects the operation similar to that of the front end circuit 7 to output a third received signal X120.

A de-spectrum spreading circuit 21 de-spectrum-spreads the third received signal X120 with a PN code X22 from a PN code signal generator 22 to output a de-spectrum-spread signal X121. Then, in an ideal condition, that is, there is no error, the following equations are provided.

Tmn+Dmn=(Jm+Dmn)+Dmn=Jm

Txm+Dxm=(Em+Dxm)+Dxm=Em wherein the PN code signal X22 is the same as the PN code X16 (Cmn, Dxm) and the frame synchronizing signals $F_1$ to $F_P$ are outputted as they are inputted.

The de-spectrum-spreading circuit 21 judges values Jm of respective data bits by integrating the additional result of mod2 between Tmn and Dmn. The de-spectrum-spread signal X121 is supplied to an error correction circuit 23 which effects the error-correction operation and output a second output data X23.

A quality of the third received signal X120 is measured by an error rate measuring circuit 24.

The error rate measuring circuit 24 responsive to an output of the additional operation of mod2 of the de-spectrum-spreading circuit 21 measures a fourth error rate of in the third received signal X120. The fourth error rate reflects a transmission quality of the upward transmission line from the mobile station 400 to the base station 300.

The error rate data detecting circuit 41 detects, i.e., extracts, the error rate data of the data bits $E^1, E^2, \ldots E^M$ in the de-spectrum-spread signal X121.

The estimation circuit 27 includes a timer 27a and averaging circuits 27b and 27c. The estimation circuit 27 averages the fourth error rates from the first error rate measuring circuit 24 and the third error rated from the error rate data detecting circuit 41 to obtain third and fourth mean values of the third and fourth error rates from a predetermined times of detection and measurement with the averaging circuits 27b and 27c respectively and displays the third and fourth means values on the second and first displays 28 and 29 respectively. Moreover, the estimation circuit 27 adaptively changes the transmission quality of downward transmission line and a transmission efficiency of the base station 300 in accordance with the third mean value.

In this case, the estimation circuit 27 displays the fourth mean value as it is on the first display 28 but displays the third mean value on the second display 29 when the fourth mean value is less than a reference REF1, that is, the transmission quality of the up-ward line is higher than a first reference value.

As the result, the value displayed on the second display 29 corresponds that the measurement values, i.e., the third error rates would be averaged in the mobile station 400 as a transmission quality of the downward line. That is, the error rate data of the signal train $E^1, E^2, \ldots, E^M$ correctly represents the third error rate when the transmission quality of the upward line is higher than a reference because the error rate data in the combined data X114 is not subjected to error correction.

In the CDMA radio wave communication system, it is general to use the same frequency bands for both upward and downward lines, so that in general meaning, the transmission qualities of the upward and downward lines should be essentially equal. However, there may be a difference between the timing when the base station 300 transmits the first radio wave signal RW1 including the signal train $I^1$, $I^2, \ldots I^M$ and the timing when the mobile station 400 transmits the third radio wave signal RW3 including the signal train $I^1, I^2, \ldots I^M$. Moreover, when the mobile station 400 moves at a high speed because it is mounted on a vehicle, a variation cycle of phasing becomes extremely short. Therefore, because of the difference in the timings the transmission quality of the upward and downward lines may be different. Therefore, the affection of the transmission quality of the upward line to the transmission quality of the downward line is essentially removed and then, the transmission quality of the downward line is obtained by detecting the error rate data of the third error rate.

Moreover, there is the case that the transmission qualities of the upward and downward lines are different because the scales of the transmission circuits 4 and 17 and the antennas 5, 6, 18, and 19 are different.

Operations of the base station 300 and the mobile station 400 will be described more specifically.

FIGS. 3A to 3F also illustrate data formats of respective signals in the CDMA radio wave communication system of the second embodiment. FIG. 3A shows the error code signal X1 including the frame synchronizing signals $F_1, F_2, F_3, \ldots, F_P$ at the top of the signal train of the error correction code signal X1, and, following to this, M data bits $I_1$ to $I_M$, each being assigned to one bit duration. This signal train of the error correction code signal X1 is intermittently transmitted several times.

As the frame synchronizing signals $F_1, F_2, F_3, \ldots, F_P$, a PN code or a corresponding signal train is used. Each of codes of the frame synchronizing signals $F_1, F_2, F_3, \ldots, F_P$ occupies one chip duration and a total duration is a predetermined integer times of one bit duration. Moreover, several cycles of the PN code signal X3 can be used as the synchronizing signals $F_1, F_2, F_3, \ldots, F_P$.

In the mobile station 400, the front end circuit 7 includes a synchronizing circuit for detecting the synchronizing signals $F_1, F_2, F_3, \ldots, F_P$ to detect the frame and effects the bit synchronizing and the chip synchronizing to provide phase synchronizing for the de-spectrum-spreading in the de-spectrum-spreading circuit 8.

The PN code signal X3 includes PN codes, wherein one bit duration is divided to N chip durations. In FIG. 3B, PN codes are different every bit duration. However, it is also possible that a set of PN codes are repeatedly used at every bit duration.

The spectrum-spreading circuit 2 effects the additional operation of mod2 between each data bit Im in the error correction code signal X1 and each code Cmn of each chip duration in the PN code signal X3 to output the spectrum-spread code trains $S_{11}$, to $S_{1N}, \ldots, S_{M1}$, to $S_{MN}$ in the spectrum-spread signal X2. At the top thereof, the frame synchronizing signals $F_1, F_2, F_3, \ldots, F_P$ are attached as they are inputted.

In the mobile station 400, the received signal X7 includes the signal train $F_1, F_2, F_3, \ldots, F_P, S_{11}$ to $S_{1N}, \ldots, S_{M1}$ to $S_{MN}$ with a delay π1 from transmission of the de-spectrum-spread signal X2 as shown in FIG. 3D. The PN code signal X9 shown in FIG. 3E includes the same PN codes $C_{11}$ to $C_{1N}$ ..., $C_{M1}$ to $C_{MN}$ as the PN codes in the PN code signal X3. The de-spectrum-spreading circuit 8 effects the additional operation of mod2 between the each of data bits $S_{11}$ to $S_{1N}$, ..., $S_{M1}$ to $S_{MN}$ and the PN code signal X9 for de-spectrum-spreading, so that the data bits $I_1$ to $I_M$ are reproduced as shown in FIG. 3F. The frame synchronizing signals $F_1$, $F_2$, $F_3$, ..., $F_P$ are not de-spectrum-spread and outputted as they are.

FIGS. 11A to 11F are illustrations of the second embodiment showing data formats of respective signals regarding the upward transmission. In FIG. 11A, the combining circuit 14 outputs the combined signal X114 including the frame synchronizing signals $F_1$, $F_2$, $F_3$, ..., $F_P$ and following to this, M data bits of $J_1$, $J_2$, ... $J_M$, and following to this, the data bits $E_1$, $E_2$, ..., $E_M$ of the error rate data representing the third error rate of the downward transmission line, wherein each bit of the data bits $E_1$, $E_2$, ..., $E_M$ is outputted at every chip duration.

In FIG. 11B, the PN code signal X16 includes PN codes, wherein one bit duration is divided to N chip durations and the PN codes are different from the PN codes in the PN codes signal X3. In FIG. 11B, PN codes are different every bit duration. However, it is also possible that a set of PN codes are repeatedly used at every bit duration.

The spectrum-spreading circuit 15 spectrum-spreads the error correction code signal X13 in the combined signal X114 to output $T_{11}$ to $T_{1N}$, ..., $T_{M1}$ to $T_{MN}$ and spectrum-spread, that is, effects the additional operation of mod2 between the data bits from the reading circuit 112 and the PN code signal X16 to output $T_{X1}'$ to $T_{XM}'$.

In the above-mentioned description, with increase in the number of the error rate data, the accuracy of the error rate increases. On the other hand, decrease in the number of the error rate data, the transmission interval can be made shorter. Moreover, an error rate of transmitting the error rate data in the upward line can be made low by assigning each bit to a plurality chip duration, though the data rate decreases.

In the base station 300, the third received signal X120 includes the signal train $F_1$, $F_2$, $F_3$, ..., $F_P$, $T_{11}$ to $T_{1N}$, ..., $T_{M1}$ to $T_{MN}$ with a delay π2 from the spectrum-spread signal X115 as shown in FIG. 11D. The PN code signal X22 includes the same PN codes $D_{11}$ to $D_{1N}$ ..., $D_{M1}$ to $D_{MN}$ as the PN codes in the PN code signal X16 as shown in FIG. 11B.

The de-spectrum-spreading circuit 21 effects the additional operation of mod2 between the each of data bits $T_{11}$ to $T_{1N}$, ..., $T_{M1}$ to $T_{MN}$ and the PN code signal X22 (FIG. 11E) for de-spectrum-spreading, so that the data bits $J_1$ to $J_M$ and data bits $E_1$, $E_2$, ..., $E_M$ are reproduced as shown in FIG. 11F.

The first error rate measuring circuit 24 obtains the first error rate from the output of the additional operation of mod2 between $T_{11}$ to $T_{1N}$, ..., $T_{M1}$ to $T_{MN}$ and the PN code X22 every one bit duration.

The error rate data detection circuit 41 detects (extracts) the error rate data in the de-spectrum-spread signal X121, that is, the data bits $E_1$, $E_2$, ..., $E_M$. This third error rate reflects the transmission qualities of the downward line.

The estimation circuit 27 averages the first error rate measured by the first error rate measuring circuit 24 over one transmission period or a plurality of transmission period.

The third error rate obtained by the error rate detection circuit 41 is estimated when the first error rate is lower than the reference REF1 and the mean value is obtained as similar.

Figure 12:
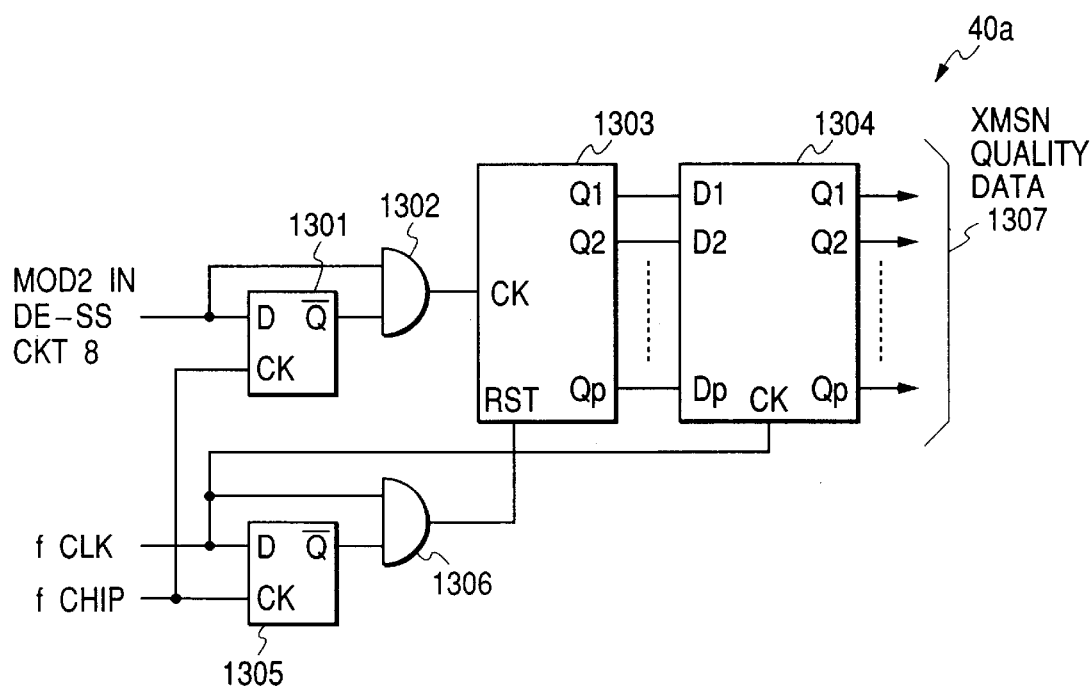
FIG. 12 is a schematic circuit diagram of a counter circuit of the second embodiment provided in the error rate measuring circuit shown in FIG. 10.

FIG. 12 is a schematic circuit diagram of a counter circuit 40a of the second embodiment provided in the error rate measuring circuit 40 shown in FIG. 10. FIGS. 13A to 13E are timing charts of the second embodiment showing respective signals of the counter circuit 40a in the error rate measuring circuit 40 shown in FIG. 12 at a data bit Jm regarding the de-spectrum-spread signal X8.

The output of the additional operation of mod2 from the de-spectrum-spreading circuit 8 is supplied to a D flip-flop circuit 1301 and to one input of a AND gate 1302 and the other input of the AND gate 1302 is supplied with $\overline{Q}$ output of the D flip-flop circuit 1301. A clock input CK of the D flip-flop circuit 1301 is supplied with a chip signal fCHIP having one chip duration. On the other hand, a D flip flop circuit 1305 is supplied with a clock signal fCLK representing one bit duration at a D input and supplied with the chip signal fCHIP at a clock input CK thereof. The D flip flop circuits 1301 and 1305 act as one-chip delay circuits. An output of the AND gate 1302 is supplied to a clock input CK of a counter 1303 and an output of the AND gate 1306 is supplied to a reset input RST of the counter 1303. Parallel output terminals Q1 to Qp of the counter 1303 are supplied to data inputs D1 to Dp of a register 1304 of which clock input CK is supplied with the clock signal fCLK. The parallel outputs of the register 1304 represent an error count value per one bit duration, that is, transmission quality data. The first error rate measuring circuit 25 stores the error count values every one bit duration and obtains the mean value.

An operation of the counter circuit 40a will be described.

In FIG. 13A, it is assumed that noise pulses p11 to p13 are appear in the output of the additional operation of mod2 at timings t12 to t14 due to interference or noise.

As shown in FIG. 13D, the AND gate 1302 generates a pulse p14 in response to a rising edge of the output of the additional operation of mod2 and then, in response to the noise pulse p11 to p13, the AND gate 1302 generates pulses p15 to p17. On the other hand, the AND gate 1306 generates pulses p18 and p19 at t11 and t15 in response to rising edges of the clock signal fCLK similarly. The counter 1303 counts in response to the output X1302 of the AND gate 1302. However, the pulses p18 and p19 resets the counter 1303, so that the counter 1303 counts only pluses p11 to p13 to output the error count, that is, the transmission quality data. With increase in the error count, the transmission quality of the downward line decreases.

The estimation circuit 27 controls the error correction control circuit 32, the data rate control circuit 31, and the transmission power control circuit 30 in accordance with the mean value of the third error rate obtained by the error rate data detection circuit 41 when the first error rate detected by the error rate measuring circuit 24 is lower than the reference REF1. That is, the base station 300 adaptively controls a transmission power, data rate, and an ability of error correction in the error coded data X1 as similar to the first embodiment.

Moreover, the estimation circuit 27 of the base station 300 performs operations shown in FIGS. 7A, 7B, and 8 as similar to the first embodiment in accordance with the mean value of the obtained third error rate and the mean value of the first error rate.

That is not, if the third error rate is lower than the reference REF2, the estimation circuit 27 of the base station 300 controls the error correction control circuit 32 to control the error correction code conversion circuit 1 to re-output the data in the memory 1a to re-transmit the data to the mobile station 400. Further, the estimation circuit 27 of the base station 300 judges whether the third error rate is lower than the reference REF2 for the predetermined interval, the estimation circuit 27 of the base station 300 controls the transmission power control circuit 30 to stop transmitting the first radio wave signal RW1 in step s15 in FIG. 8.

What is claimed is:

1. A method of CDMA radio wave communication comprising the steps of:
   generating a first radio wave signal at a transmission efficiency including the steps of:
   spreading first data with a first PN code; and
   transmitting the spread first data from a first place as said first radio wave signal;
   receiving said first data from said first radio wave signal from said first place at a second place remote from said first place;
   despreading the received first data;
   converting at least a portion of the despread first data into rate converted data having a first data rate to output rate converted data;
   multiplexing said rate converted data with a second data having a second data rate to output a combined data, said first data rate being higher than said second data rate;
   spreading said combined data with a second PN code;
   transmitting the spread combined data from said second place;
   receiving the transmitted combined data at said first place as third data;
   despreading the third data into fourth data;
   measuring a first transmission quality of the third data at said first place;
   measuring a second transmission quality of said rate converted data at said first place; and
   outputting the measured second transmission quality when said first transmission quality is higher than a reference.

2. The method as claimed in claim 1, further comprising the step of: storing said first data at said first place, wherein said first transmission quality is measured by detecting a first error rate in said despread third data and said second transmission quality is measured by detecting a second error rate through comparing the stored first data and despread fourth data.

3. The method as claimed in claim 2, further comprising the step of:
   averaging said first error rate to obtain said first transmission quality at said first place; and
   averaging said second error rate to obtain said second transmission quality at said first place.

4. The method as claimed in claim 1, further comprising the step of:
   controlling generating first radio wave signal in accordance with the measured second transmission quality.

5. The method as claimed in claim 4, wherein controlling generating first radio wave signal is made such that said second transmission quality is increased when said second transmission quality is lower than a second reference and said first transmission quality is higher than said reference at said first place and said transmission efficiency is increased when said second transmission quality is higher than said second reference.

6. The method as claimed in claim 1, further comprising the steps of:
   storing said first data at said first place;
   reading said first data; and
   re-transmitting the read first data after the first data is once transmitted by generating said first radio wave signal from said first place when said first transmission quality is higher than said reference and said second transmission quality is lower than a second reference.

7. The method as claimed in claim 1, further comprising the steps of:
   measuring an interval during which the condition that the first transmission quality is higher than said reference and second transmission quality is lower than said second reference at said first place;
   judging whether said interval is longer than a reference value at said first place; and
   stopping generating said first radio wave signal from said first place when said interval is longer than said reference.

8. A base station comprising:
   radio wave generation means for generating a radio wave signal at a transmissions efficiency, said radio wave generation means including:
   spreading means for spreading first data with a first PN code; and
   transmitting means for transmitting the spread first data as said radio wave signal;
   receiving means for receiving a radio wave as third data including combined data including second data and rate converted data spread with a second PN code from a mobile station, said rate converted data being generated from at least a portion of the first data received by said mobile station, said rate converted data having a first data rate higher than a second data rate of said second data;
   despreading means for despreading the received combined data as fourth data;
   first measuring means for measuring a first transmission quality of an upward transmission from said mobile station from the combined data from said despreading means;
   second measuring means for measuring a second transmission quality of a downward transmission to said mobile unit from the rate converted data from said despreading means; and
   outputting means for outputting the measured second transmission quality when said first transmission quality is higher than a reference.

9. The base station as claimed in claim 8, further comprising:
   a memory for storing said first data, wherein said first measuring means detects said first transmission quality by detecting a first error rate in an output of said despread means and said second measuring means detects a second error rate through comparing said first data from said memory and despread fourth data to measure said second transmission quality.

10. The base station as claimed in claim 8, further comprising:
    first averaging means for averaging said first error rate to obtain said first transmission quality; and
    second averaging means for averaging said second error rate to obtain said second transmission quality.

11. The base station as claimed in claim 8, further comprising:
    control means for controlling said radio wave generation means in accordance with the measured second transmission quality.

12. The method as claimed in claim 11, wherein control means controls said first radio wave signal such that said second transmission quality is increased when said second transmission quality is lower than a second reference and said first transmission quality is higher than said reference and said transmission efficiency is increased when said second transmission quality from said second measuring means is higher than said second reference.

13. The base station as claimed in claim 8, further comprising:

a memory for storing said first data; and control means for reading said first data from said memory and supplying the read first data to spreading means to re-transmit said first data when said first transmission quality is higher than said reference and said second transmission quality is lower than a second reference.

14. The base station as claimed in claim 8, further comprising:

interval measuring means for measuring an interval in the condition that the first transmission quality is higher than said reference and said second transmission quality is lower than said second reference;

judging means for judging whether said interval is longer than a reference value; and control means for control said transmitting means for stopping transmitting the spread first data when said interval is longer than said reference value.

15. A mobile station comprising:

receiving means for receiving first data spread with a first PN code and transmitted from a base station;

despreading means for despreading said first data from said receiving means with a first PN code;

rate conversion means for rate converting at least a portion of said first data from said despreading means to have a second data rate to output rate converted data;

multiplexing means for multiplexing the rate converted data with second data to output a combined data, a data rate of the rate converted data being higher than a data rate of said second data;

spreading means for spreading said combined data with a second PN code; and transmitting means for transmitting the spread combined data.

16. A mobile station as claimed in claim 15, further comprising: error rate correction code signal conversion means for converting said second data to an error-correction-code signal and supplying said error-correction-code signal to said multiplexing means as said second data.

* * * * *